United States Patent

Anton et al.

[11] Patent Number: 5,914,384
[45] Date of Patent: *Jun. 22, 1999

[54] COATING COMPOSITIONS CONTAINING A HIGHLY FLUORINATED HYDROXYL CONTAINING ADDITIVE

[75] Inventors: Douglas Robert Anton, Wilmington, Del.; Michael J. Darmon, Aston; William Frank Graham, Wayne, both of Pa.; Richard Ronald Thomas, Wilmington, Del.

[73] Assignee: E. I. du Pont de Nemours and Company, Wilmington, Del.

[*] Notice: This patent is subject to a terminal disclaimer.

[21] Appl. No.: 08/975,779

[22] Filed: Nov. 21, 1997

[51] Int. Cl.⁶ .......................... C08G 18/42; C08G 18/68
[52] U.S. Cl. .............................. 528/83; 528/84; 528/85; 528/70; 528/75; 528/303; 528/397; 524/507; 524/544; 428/423.1; 428/421
[58] Field of Search .................. 528/83, 84, 85, 528/70, 75, 303, 397; 524/507, 544; 428/423.1, 421

[56] References Cited

U.S. PATENT DOCUMENTS

| | | | |
|---|---|---|---|
| 2,803,615 | 8/1957 | Ahlbrecht et al. | 260/29.6 |
| 3,318,852 | 5/1967 | Dixon | 260/78.5 |
| 3,533,977 | 10/1970 | Read | 260/28.5 |
| 4,366,299 | 12/1982 | Dessaint | 526/243 |
| 4,371,657 | 2/1983 | Chang | 524/512 |
| 4,396,680 | 8/1983 | Chang | 428/421 |
| 4,791,166 | 12/1988 | Saukaitis | 524/544 |
| 4,812,337 | 3/1989 | Sugimura et al. | 437/407.1 |
| 4,859,754 | 8/1989 | Mackawa et al. | 526/245 |
| 5,064,695 | 11/1991 | Hotta et al. | 427/407.1 |
| 5,100,962 | 3/1992 | Sawada et al. | 525/125 |
| 5,159,017 | 10/1992 | Miyazono et al. | 525/123 |
| 5,171,877 | 12/1992 | Knaup et al. | 560/26 |
| 5,206,286 | 4/1993 | Swarup et al. | 524/761 |
| 5,250,698 | 10/1993 | Falk et al. | 548/260 |
| 5,356,668 | 10/1994 | Paton et al. | 427/2.25 |
| 5,629,372 | 5/1997 | Anton et al. | 524/507 |

OTHER PUBLICATIONS

Photooxidation of functionalized perfluroinated polyethers–I, J. Scheirs et al., Polymer Degradation and Stability, 56 (1997) 239–253.

*Primary Examiner*—Duc Truong
*Attorney, Agent, or Firm*—Hilmar L. Fricke

[57] ABSTRACT

A coating composition that forms a finish that is soil resistant and easily cleaned having a binder of (A) an acrylic polymer of polymerized hydroxyl containing monomers of hydroxy alkyl (meth)acrylates having 1–4 carbon atoms in the alkyl groups and polymerized monomers from the group of alkyl (meth)acrylates having 1–18 carbon atoms in the alkyl groups, styrene or any mixtures of the above and the acrylic polymer has a weight average molecular weight of about 2,000–20,000 determined by gel permeation chromatography, (B) an acrylic polymeric additive of polymerized hydroxyl containing monomers of hydroxy alkyl (meth)acrylates having 1–4 carbon atoms in the alkyl groups, polymerized monomers from the group of alkyl (meth)acrylates having 1–18 carbon atoms in the alkyl groups, styrene or any mixtures of the above and polymerized fluoro alkyl containing monomer represented by the formula

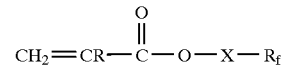

where R is selected from the group of hydrogen or an alkyl group having 1–2 carbon atoms, X is a divalent radical and $R_f$ is a fluoro alkyl containing group having 4–20 carbon atoms and the additive has a weight average molecular weight of about 1,000–15,000 determined by gel permeation chromatography, and (C) an organic crosslinking agent; and where a cured layer of the coating of the composition has a combination of advancing water contact angle of at least 100° and a hexadecane advancing contact angle of at least 40°. Articles coated with the composition also are part of this invention.

13 Claims, No Drawings

COATING COMPOSITIONS CONTAINING A HIGHLY FLUORINATED HYDROXYL CONTAINING ADDITIVE

BACKGROUND OF THE INVENTION

1. Field of the Invention

This invention is directed to a coating composition of an acrylic polymer and a crosslinking agent such as a polyisocyanate or a melamine crosslinking agent and contains a highly fluorinated hydroxyl containing additive that forms a finish that remains relatively dirt free under exterior use conditions and is easily cleaned when soiled, for example by washing with water.

2. Description of the Prior Art

Acrylic polymer containing coating compositions crosslinked with a polyisocyanate are well known as shown in Vasta U.S. Pat. No. 3,558,564 issued Jan. 26, 1971 and Krueger U.S. Pat. No. 4,156,678 issued May 29, 1979. Coating compositions of blends of acrylic polymers and acrylic polymer containing fluorocarbon constituents that form antiicing coatings are well known. Clear coats containing acrylic polymers having small amounts of fluorocarbon constituents that are applied over metallic base coats to provide auto finishes that have good weatherability, have high water and oil repellence and stain resistance are shown in Sugimura et al U.S. Pat. No. 4,812,337 issued Mar. 14, 1989.

Fluorinated polyurethanes that are used as soil release agents are shown in Gresham U.S. Pat. No. 3,759,874 issued Sep. 18, 1973. Polyurethanes of fluorinated isocyanates that are used as adhesives are shown in Mitsch et al U.S. Pat. No. 3,972,856 issued Aug. 3, 1976. Protective coatings of fluorinated polyurethanes of fluorinated diols or triols are shown in Re et al U.S. Pat. No. 4,782,130 issued Nov. 1, 1988.

There is a need for a fluoro carbon containing additive that can be added to a conventional coating composition that will form a coating composition that is high in solids, can be applied with conventional equipment and cures to a hard, tough, durable and weatherable finish without baking at elevated temperatures and the finish is soil resistant and is easily cleaned. Preferably the coating composition has a low content of fluorocarbon constituents which reduces the cost of the composition since the fluorocarbon constituent is expensive.

SUMMARY OF THE INVENTION

A coating composition containing about 45–80% by weight of a binder and 20–55% by weight of a carrier liquid; wherein the binder contains (A) an acrylic polymer of polymerized hydroxyl containing monomers of hydroxy alkyl (meth)acrylates having 1–4 carbon atoms in the alkyl groups and polymerized monomers from the group of alkyl (meth)acrylates having 1–18 carbon atoms in the alkyl groups, styrene or any mixtures of the above and the acrylic polymer has a weight average molecular weight of about 2,000–20,000 determined by gel permeation chromatography, (B) an acrylic polymeric additive of about 10–45% by weight, based on the weight of the additive, of polymerized hydroxyl containing monomers of hydroxy alkyl (meth)acrylates having 1–4 carbon atoms in the alkyl groups, 5–80% by weight, based on the weight of the additive, of polymerized monomers from the group of alkyl (meth)acrylates having 1–18 carbon atoms in the alkyl groups, styrene or any mixtures of the above and 10–50% by weight, based on the weight of the additive of polymerized fluoro alkyl containing monomer represented by the formula

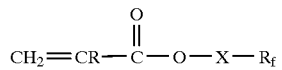

where R is selected from the group of hydrogen or an alkyl group having 1–2 carbon atoms X is a divalent radical and $R_f$ is a fluoro alkyl containing group having 4–20 carbon atoms and the additive has a weight average molecular weight of about 1,000–15,000 determined by gel permeation chromatography, and (C) an organic crosslinking agent; and where a cured layer of the coating of the composition has a combination of advancing water contact angle of at least 100° and a hexadecane advancing contact angle of at least 40°.

Articles coated with the composition also are part of this invention.

DETAILED DESCRIPTION OF THE INVENTION

Coating compositions of this invention are primarily used as a clear coat over a pigmented base coat containing solid color pigments or metallic flake pigments or mixtures thereof. The coating composition also can be used as a conventional pigmented monocoat or basecoat composition. Conventional spray equipment can be used to apply these coating compositions which are cured at ambient temperatures or slightly elevated temperatures which decrease drying time. The resulting finish has excellent gloss and distinctness of image and excellent dirt, water and oil repellency, is easily cleaned by washing with water or with a water surfactant mixture or can be wiped clean and has good stain resistance and weatherability.

Preferably, the coating composition is a clear coating composition, i.e. containing no pigments or a small amount of transparent pigment. The composition has a relatively high solids content of about 45–80% by weight of binder and about 20–55% by weight of a carrier which usually is an organic carrier that can be a solvent for the binder or a mixture of solvents and non solvents which would form a non aqueous dispersion. The composition has a low VOC (volatile organic content) and meets current pollution regulations.

The coating composition when applied to a substrate and fully cured has a water advancing contact angle of at least 100°, preferably 100–120° and a hexadecane advancing contact angle of at least 40°, preferably 45–85° and more preferably 60–85°.

Contact angles are measured by the Sessile Drop Method which is fully described in A. W. Adamson, *The Physical Chemistry of Surfaces,* 5th Ed., Wiley & Sons, N.Y., 1990, Chapter II which is hereby incorporated herein by reference.

Briefly, in the Sessile Drop Method, a drop of liquid, either water or solvent, is placed on a surface and the tangent is precisely determined at the point of contact between the drop and the surface. An advancing angle is determined by increasing the size of the drop of liquid and a receding angle is determined by decreasing the size of the drop of liquid. Additional information on the equipment and procedure needed to measure these contact angles are more fully described in R. H. Dettre, R. E. Johnson Jr., *Wettability,* Ed.

by J. C. Berg, Marcel Dekker, N.Y., 1993, Chapter 1 which is incorporated herein by reference.

The relationship between water and organic liquid contact angles and cleanability and dirt retention is described in chapters XII and XIII of A. W. Adamson, above. In general, the higher the contact angle the more dirt or soil resistant the surface is and the easier the surface is to clean. The coating compositions of this invention have relatively high contact angles and are dirt resistant and easily cleaned.

Typically, the coating composition contains about 30–89% by weight, based on the weight of the binder, of an acrylic polymer, 1–20% by weight, based on the weight of the binder, of an acrylic polymeric additive and 10–50% by weight, based on the weight of the binder, of a crosslinking agent.

The acrylic polymer used in the coating composition is prepared by conventional polymerization process in which the monomers, solvents and polymerization initiator are charged over a 1–24 hour period of time, preferably in a 2–8 hour time period, into a conventional polymerization reactor in which the constituents are heated to about 60–175° C., preferably about 140–170° C. The acrylic polymer formed has a weight average molecular weight of about 2,000–20,000, preferably about 5,000–10,000.

Molecular weight referred to herein are determined by gel permeation chromatography using polystyrene as the standard.

Typical polymerization initiators that are used in the process are azo type initiators such as azo-bis-isobutyronitrile, 1,1'-azo-bis(cyanocyclohexane), peroxy acetates such as t-butyl peracetate, peroxides such as di-t-butyl peroxide, benzoates such as t-butyl perbenzoate, octoates such as t-butyl peroctoate and the like.

Typical solvents that can be used in the process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixture of any of the above.

Typical polymerizable monomers that are used to form the acrylic polymer are alkyl (meth)acrylates, meaning alkyl acrylates and alkyl methacrylates, having 1–18 carbon atoms in the alkyl group such as methyl methacrylate, ethyl acrylate, ethyl methacrylate, propyl acrylate, propyl methacrylate, isopropyl methacrylate, butyl acrylate, isobutyl methacrylate, butyl methacrylate, t-butyl methacrylate, pentyl acrylate, pentyl methacrylate, hexyl acrylate, hexyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate; other useful monomers are styrene, alpha methyl styrene, acrylamide, methacrylamide, acrylonitrile, hydroxy methacrylamide and the like; or any mixtures of these monomers, and hydroxy alkyl (meth) acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like.

Preferred acrylic polymers which form high quality coatings contain polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group and styrene. One particularly preferred polymer contains butyl methacrylate, butyl acrylate, styrene, and hydroxy propyl acrylate.

The acrylic polymer additive used in the coating composition is prepared similarly to the above acrylic polymer by conventional polymerization process in which the monomers, except the fluoroalkyl containing monomer, solvent, and polymerization initiator are charged over a 1–24 hour period of time, preferably in a 2–8 hour time period, into a conventional polymerization reactor in which the constituents are heated to about 60–175° C., preferably about 140–170° C. The polymer formed has a weight average molecular weight of about 1,000–15,000, preferably about 1,000–10,000.

The aforementioned polymerization initiators, solvents and the other monomers such as alkyl (meth)acrylate, hydroxy alkyl (meth)acrylate and/or styrene can be used to prepare the additive including acrylamide, methacrylamide, acrylonitrile, hydroxy methacrylamide and the like.

The acrylic polymeric additive contains about 10–45% by weight of the hydroxy alkyl (meth)acrylate, 5–80% by weight of the other aforementioned alkyl (meth)acrylate, styrene and the like and 10–50% of fluoro alkyl containing monomers.

The fluoroalkyl containing monomers that are used in the acrylic polymeric additive are represented by the formula

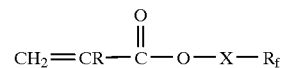

where R is hydrogen or an alkyl group having 1–2 carbon atoms, X is a divalent radical, preferably, a hydrocarbon group having 2–20 carbon atoms, and more preferably X is —(CH$_2$)$_n$— where n is an integer of 1–18 and R$_f$ is a fluoroalkyl containing group having 4–20 carbon atoms and preferably a straight chain or branched chain fluoroalkyl group having 4–20 carbon atoms which optionally can contain an oxygen atom.

Typically useful fluoroalkyl containing monomers are perfluoro methyl ethyl methacrylate, perfluoro propyl ethyl methacrylate, perfluoro butyl ethyl methacrylate, perfluoro pentyl ethyl methacrylate, perfluoro hexyl ethyl methacrylate, perfluoro octyl ethyl methacrylate, perfluoro decyl ethyl methacrylate, perfluoro lauryl ethyl methacrylate, perfluoro stearyl ethyl methacrylate, perfluoro methyl ethyl acrylate, perfluoro ethyl ethyl acrylate, perfluoro butyl ethyl acrylate, perfluoro pentyl ethyl acrylate, perfluoro hexyl ethyl acrylate, perfluoro octyl ethyl acrylate, perfluoro decyl ethyl acrylate, perfluoro lauryl ethyl acrylate, perfluoro stearyl ethyl acrylate, and the like. Preferred are perfluoro alkyl ethyl methacrylates wherein the perfluoroalkyl group contains 4–20 carbon atoms.

Other useful fluoroalkyl containing monomers are represented by the formula

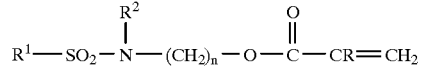

where
  R is as defined above,
  R$^1$ is a fluoroalkyl group having 4–12 carbon atoms,
  R$^2$ is an alkyl group having 1–4 carbon atoms and
  n is an integer of 1–4.

Typical of these monomers are the following:

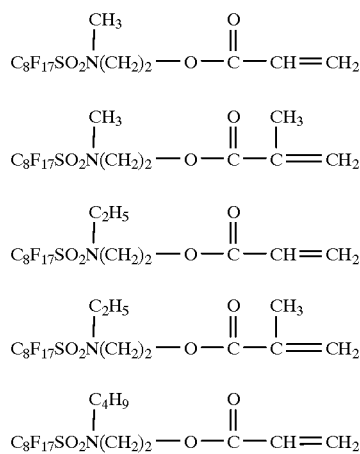

Preferred acrylic polymeric additives which form high quality coatings contain polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group, styrene and perfluoroalkyl ethyl methacrylate having 4–20 carbon atoms in the alkyl group. One particularly preferred polymer contains butyl methacrylate, butyl acrylate, styrene, hydroxy propyl acrylate and the above perfluoroalkyl containing monomer.

Other useful acrylic polymeric additives contain polymerized monomers of an alkyl methacrylate having 2–6 carbon atoms in the alkyl group, an alkyl acrylate having 2–8 carbon atoms in the alkyl group, styrene, an alkylene glycol methacrylate and a perfluoro alkyl ethyl methacrylate having 4–20 carbon atoms in the alkyl group. Another useful polymeric additive contains butyl methacrylate, butyl acrylate, hydroxy propyl acrylate, ethylene triglycol methacrylate and the above perfluoro alkyl ethyl methacrylate monomer.

The coating composition contains an organic crosslinking agent capable of crosslinking with the hydroxyl groups of the polymeric additive and the acrylic polymer. Preferably, an organic polyisocyanate crosslinking agent or an alkylated melamine crosslinking agent.

Any of the conventional aromatic, aliphatic, cycloaliphatic isocyanates, trifunctional isocyanates and isocyanate functional adducts of polyols and diisocyanates can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur"N-3390.

Isocyanate functional adducts can be used that are formed from an organic polyisocyanate and a polyol. Any of the aforementioned polyisocyanates can be used with a polyol to form an adduct. Polyols such as trimethylol alkanes like trimethylol propane or ethane can be used. One useful adduct is the reaction product of tetramethylxylidine diisocyanate and trimethylol propane and is sold under the tradename "Cythane" 3160.

A fluorinated organic polyisocyanate crosslinking agent which is an adduct of a fluorinated monofunctional alcohol and one of the aforementioned conventional organic polyisocyanate can also be used. About 0.1–33 mole percent of active isocyanate groups of one of the polyisocyanate are reacted with the fluorinated monofunctional alcohol to form the fluorinated organic polyisocyanate. Typically, the constituents are reacted with a catalyst for about 0.1–4 hours at a temperature of about 50–120° C. to form the adduct.

Typical fluorinated monofunctional alcohols used to form the isocyanate functional adducts are represented by the formula

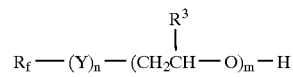

where $R_f$ is a fluoroalkyl containing group having at least 4 carbon atoms and preferably a straight chain or branched chain fluoroalkyl group having 4–20 carbon atoms which optionally can contain oxygen atoms as ether groups or can contain 1–5 chlorine atoms or 1–5 hydrogen atoms. Preferably, $R_f$ is a perfluoroalkyl group having 4–20 carbon atoms. Y is a divalent radical, preferably —$CH_2CH_2O$—, —$SO_2N(R^4)CH_2CH_2O$—, —$CH_2$—, —$O$—, $CH_2O$— where $R^4$ is an alkyl group preferably having 1–4 carbon atoms. $R^3$ is H or an alkyl group having 1–4 carbon atoms, H and methyl being preferred, n is 0–1 and m is 1–30, provided that if n is 0, then m must be greater than or equal to 1; if Y is —O—, m must be greater than or equal to 1; m preferably is 1–20.

The following are preferred fluorinated monofunctional alcohols:

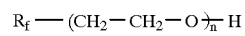

where $R_f$ is a perfluoroalkyl group having 6–12 carbon atoms and n is 5–15;

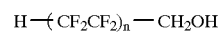

where n is 1–6;

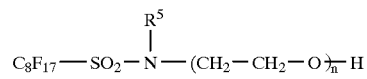

where $R^5$ is an alkyl group having 1–4 carbon atoms and n is 1–30;

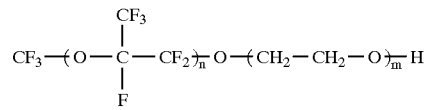

where n is 0–10 and m is 1–20; and $R_f$—$CH_2$—$CH_2$—OH where $R_f$ is described above.

Alkylated melamine crosslinking agents can also be used in the composition. These crosslinking agents are generally partially or fully alkylated melamine formaldehyde compounds that may be monomeric or polymeric and if polymeric have a degree of polymerization of about 1–3. Typical alcohols used to alkylate these resins are methanol, ethanol, propanol, butanol, isobutanol and the like. Typically useful alkylated melamine crosslinking agents are available commercially include the following: Cymel® 301, 350, 373, 385, 1161, or 1168, or Resimine® 714, 730, 731, 735 and 745. Usually, a strong acid catalyst or its salt is added in an amount of about 0.1–3% by weight, based on the weight of the binder, to lower the curing temperature. Para toluene sulfonic acid, dodecyl benzene sulfonic acid, phosphoric acid or the amine or ammonium salts of these acid can be used.

To improve weatherability of a clear coating composition about 0.1–10% by weight, based on the weight of the binder, of ultraviolet light stabilizers, screeners, quenchers and antioxidants usually are added. Typical ultraviolet light screeners and stabilizers include the following:

Benzophenones such as hydroxy dodecyl oxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxy phenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxybenzoyl)-triazole, substituted benzotriazoles such as hydroxy-phenyltriazole and the like.

Hindered amines such as bis(1,2,2,6,6 pentamethyl-4-piperidinyl sebacate), di[4(2,2,6,6,tetramethyl piperidinyl)] sebacate and the like and any mixtures of any of the above.

When using an isocyanate crosslinking agent, the coating composition contains a sufficient amount of a catalyst to cure the composition at ambient temperatures. Generally, about 0.01–2% by weight, based on the weight of the binder, of catalyst of one of the following catalysts is used to for a polyisocyanate crosslinking agent is used: triethylene diamine, alkyl tin laurates such as dibutyl tin dilaurate, dibutyl tin diacetate, tertiary amines and the like. Preferred is dibutyl tin dilaurate.

Generally, flow control agents are used in the composition in amounts of about 0.1–5% by weight, based on the weight of the binder, such as polyacrylic acid, polyalkylacrylates, polyether modified dimethyl polysiloxane copolymers and polyester modified polydimethyl siloxane.

When the coating composition is used as a clear coating composition usually over a pigmented base coat, it may be desirable to use pigments in the coating composition which have the same refractive index as the dried coating. Typically useful pigments have a particle size of about 0.015–50 microns and are used in a pigment to binder weight ratio of about 1:100 to 10:100 and are inorganic siliceous pigments such as silica pigment having a refractive index of about 1.4–1.6.

It is highly desirable to use at least some fluorinated organic polyisocyanate crosslinking agent, as described above, in the pigmented base coat over which the clear coat of this invention is applied to significantly reduce cratering of the base coat. Usually, about 5–40% by weight, based on the weight of the binder, of the fluorinated polyisocyanate is used in the base coat.

When the coating composition is used as a clear coating on a vehicle such as a car, truck, bus, train, or on construction equipment, industrial equipment, structures such as tanks, bridges, exterior or interior of buildings, a basecoating which may be either a solvent based or waterbased composition is first applied and then the clear coating is applied usually by conventional means such as spraying or electrostatic spraying. The clear coating is dried and cures at ambient temperatures but moderately high temperatures of up to about 90° C. can be used to shorten drying time.

The coating composition can be used as a conventional pigmented coating composition containing pigments in a pigment to binder weight ratio of about 0.1/100–100/100. The composition can be used to coat any of the aforementioned items and substrates and provides a finish that has good gloss and is weatherable, tough and hard.

The following examples illustrate the invention. All parts and percentages are on a weight basis unless otherwise specified. Molecular weight was determined by gel permeation chromatography using polystyrene as the standard.

EXAMPLE 1

A fluorinated acrylic polymeric additive solution A was prepared by charging the following constituents into a reactor equipped with a heat source, a thermometer and a stirrer:

|  | Parts By Weight |
|---|---|
| Portion 1 | |
| Methyl amyl ketone | 465.83 |
| Portion 2 | |
| Butyl methacrylate monomer (BMA) | 368.10 |
| Styrene monomer (S) | 204.51 |
| Hydroxy propyl acrylate monomer (HPA) | 521.43 |
| Fluoro alkyl ethyl methacrylate monomer (FAMA)- (fluoro alkyl group containing C-4 about 5%, C-6 about 30%, C-8 about 30%, C-10 about 20%, C-12 about 10%, C-14 about 5%) | 272.67 |
| Methyl amyl ketone | 3.14 |
| Portion 3 | |
| T-butyl peroxy acetate | 45.93 |
| Methyl amyl ketone | 76.27 |
| Portion 4 | |
| Methyl amyl ketone | 42.12 |
| Total | 2000.00 |

Portion 1 was charged into the reaction vessel and blanketed with nitrogen and Portion 2 was premixed and added over a 240 minute period while holding the resulting mixture at its reflux temperature of about 150° C. Portion 3 was premixed and added at the same time as Portion 2 to the reaction mixture over a 255 minute period and then Portion 4 was added and the reaction mixture was held at its reflux temperature for an additional 60 minutes. The resulting polymer solution was cooled to room temperature.

The resulting fluorinated acrylic polymeric additive solution A had a weight solids content of about 70%, a polymer of BMA/S/HPA/FAMA in the following percentages 26.9%/15.0%/38.2%/19.9% and the polymer had a weight average molecular weight of about 4,500.

A fluorinated acrylic polymeric additive solution B was prepared using the same constituents and procedure except the ratio of monomers where changed and the resulting polymer had the following composition BMA/S/HPA/FAMA 17%/15%/38%/30%

An acrylic polymer I solution was prepared by charging the following constituents into a reactor equipped with a heat source, a thermometer and a stirrer:

|  | Parts By Weight |
| --- | --- |
| Portion 1 | |
| Methyl amyl ketone | 699.20 |
| Portion 2 | |
| Butyl methacrylate monomer (BMA) | 583.80 |
| Styrene monomer (S) | 307.28 |
| Butyl acrylate monomer (BA) | 343.20 |
| Hydroxy propyl acrylate monomer (HPA) | 783.60 |
| Methyl amyl ketone | 4.72 |
| Portion 3 | |
| T-butyl peroxy acetate | 69.01 |
| Methyl amyl ketone | 114.59 |
| Portion 4 | |
| Methyl amyl ketone | 33.28 |
| Total | 2938.68 |

Portion 1 was charged into the reaction vessel and blanketed with nitrogen and Portion 2 was premixed and added over a 240 minute period while holding the resulting mixture at its reflux temperature of about 150° C. Portion 3 was premixed and added at the same time as Portion 2 to the reaction mixture over a 255 minute period and then Portion 4 was added and the reaction mixture was held at its reflux temperature for an additional 60 minutes. The resulting polymer solution was cooled to room temperature.

The resulting acrylic polymer solution I had a weight solids content of about 70%, a polymer of BMA/S/BA/HPA in the following percentages 30%/15%/17%/38% and the polymer had a weight average molecular weight of about 7,000.

A clear acrylic composition I was prepared as follows:

|  | Parts by Weight |
| --- | --- |
| Portion 1 | |
| Methyl ethyl ketone | 2.54 |
| Toluene | 2.67 |
| Dibasic acid ester (ester mixture of adipic acid, glutaric acid and succinic acid) | 1.79 |
| Butyl Cellosolve Acetate | 4.96 |
| Portion 2 | |
| Acrylic polymer I solution (prepared above) | 72.79 |
| Portion 3 | |
| Resiflow S (Acrylic polymer flow additive) | 0.35 |
| "Tinuvin" 328 - 2-(2-hydroxy-3,5-ditertiary amyl phenol)-2H-benzotnazole) | 5.58 |
| "Tinuvin" 292 - (1,2,2,6,6-pentamethyl-4-piperidinyl) sebacate | 0.87 |
| Dibutyl tin dilaurate | 0.92 |
| PM acetate | 7.38 |
| Total | 100.00 |

The constituents of Portion 1 were charged into a mixing vessel in the order shown with continuous mixing. Portion 2 was added and mixed for 15 minutes. The constituents of Portion 3 were charged into the mixing vessel in the order shown with constant mixing. The resulting composition had a solids content of about 53.5%.

A clear coating composition I (control) was prepared by mixing the above clear acrylic composition I with a polyisocyanate solution in a 3/1 volume ratio. The polyisocyanate solution contains 90% by weight of the trimer of hexamethylene diisocyanate and 10% by weight of a solvent of n-butyl acetate/Aromatic 100 solvent in a 1:1 ratio. Clear coating compositions A and B, were prepared by mixing the above clear coating composition I respectively with 2.0% and 5.0% by weight of the fluorinated acrylic polymeric additive solution A, prepared above.

Similarly, clear coating compositions C and D were prepared by mixing the above clear coating composition respectively with 2.0% and 5.0% by weight of the fluorinated acrylic polymeric additive solution B, prepared above.

A set of two phosphated cold rolled steel panels that have been coated with a cured electrocoating primer composition of a polyepoxy hydroxy ether resin crosslinked with a polyisocyanate were spray coated with a white basecoat coating composition of an acrylic polymer containing an organic polyisocyanate crosslinking agent to a dry film thickness of about 18–23 microns.

The basecoat was allowed to stand for about 10 minutes to allow solvent to evaporate and then the above prepared clear coating composition I (control) was spray applied. Two coats were applied with a solvent evaporation time of 2 minutes between the application of each coat. The resulting film was dried at about 83° C. for about 30 minutes. The dry film thickness of the clear coat was about 44–56 microns. The resulting clear coat was smooth and essentially free of craters and had an excellent appearance.

Clear coating compositions A–D were applied in the same manner to separate phosphated steel panels coated with primer and basecoat as above. In each case, the resulting clear coat was smooth and essentially free of craters and had an excellent appearance.

The following tests were conducted on each of the panels and the results are shown in Table I:

Advancing and Receding contact angles for water and hexadecane.

Gloss measured at 20°.

DOI distinctness of image.

Haze

Hardness (measured in knoops)

L, a, b, color angle values.

Soil Resistance Test.

Soil Resistance Test

A soil substitute was prepared by blending 10 g of Nujol (mineral oil), 20 g of carbon black, 500 ml of heptane and 1 liter of "Surlyn" polymer beads (polymer of an acrylic ionomer). The resulting suspension was thoroughly mixed and then the heptane solvent was stripped off using a vacuum stripper.

A 2.54 cm length of 7.62 cm OD polyvinyl chloride pipe was place on the surface of the test panel. Three grams of the above prepared soil substitute was poured into the pipe and gently rolled around on the surface of the test panel for a total of fifty rotations. The soil substitute was poured off and the pipe segment was removed. The test panel was then tapped sharply twice on the side of a trash can to remove lightly adhered dirt. The amount of dirt remaining on the panel was measured in delta E units with a color analyzer.

The data in Table I shows that clear coating compositions A–D that contain a fluorinated acrylic polymeric additive have a higher contact angle for water and for hexadecane in comparison to the control which did not contain the additive. The Soil Resistance Test shows that coating compositions A–D that contained the fluorinated acrylic polymeric additive provides a finish which is resistant to soiling and also is easily washed or wiped clean in comparison to the clear coating composition made from the control which did not contain a fluorinated acrylic polymeric additive. The control had low contact angles and exhibited poor soil resistance in the Soil Resistance Test and poor cleanability. All of the coating compositions with and without the fluorinated acrylic polymeric additive had comparable gloss, distinctness of image, haze and hardness and had an acceptable color.

EXAMPLE 2

A clear coating composition E was prepared by mixing together the following constituents:

|  | Parts by Weight |
|---|---|
| Acrylic Polymer I solution (prepared in Example 1) | 215.4 |
| "Cymel" 1168 (alkylated melamine formaldehyde resin) | 80.1 |
| Fluorinated acrylic polymeric additive solution B (prepared in Example 1) | 10.7 |
| Catalyst (aromatic sulfonic acid in isopropanol) | 1.8 |
| Total | 308.0 |

Clear coating composition E was applied in the same manner as in Example 1 to phosphated steel panels coated with an electrocoating primer and base coat as described in Example 1 and cured providing a clear coat that was smooth, essentially free of craters and had an excellent appearance. The panels were tested as in Example 1 and the test results are shown in Table I.

TABLE

| Clear Coating | Additive (Wt %) | *Water Contact Angle | *Hexadecane Contact Angle | Gloss Measured at 20° | DOI | Haze | Hardness (knoops) | Lab Color Angles L | a | b | Soil Resistance Test (Delta E Units) |
|---|---|---|---|---|---|---|---|---|---|---|---|
| Control | 0 | 75/58 | 0/0 | 86 | 95 | 11.8 | 9.5 | 87.36 | −1.59 | 0.65 | 35.3 |
| Coating A | Additive A (2.0%) | 108/72 | 58/53 | 86 | 93 | 2.63 | 12.3 | 88.97 | −1.48 | 0.62 | 1.68 |
| Coating B | Additive A (5.0%) | 110/72 | 60/53 | 86 | 91 | 3.22 | 11.4 | 88.78 | −1.59 | 0.67 | 2.92 |
| Coating C | Additive B (2.0%) | 110/71 | 61/57 | 88 | 84 | 3.87 | 11.7 | 88.62 | −1.48 | 0.74 | 3.40 |
| Coating D | Additive B (5.0%) | 113/76 | 61/56 | 86 | 89 | 3.31 | 12.3 | 87.08 | −1.42 | −0.78 | 10.7 |
| Coating E | Additive B (3.5%) | 107/72 | 76/43 | 82.8 | 92.4 | 38.2 | 12.8 | 88.0 | −1.46 | −0.33 | 24.9 |

*Advancing/Receding contact angle for water and hexadecane.

We claim:

1. A coating composition containing about 45–80% by weight of a binder and 20–55% by weight of a carrier liquid; wherein the binder comprises (A) an acrylic polymer comprising polymerized hydroxyl containing monomers consisting of hydroxy alkyl (meth)acrylates having 1–4 carbon atoms in the alkyl groups and polymerized monomers selected from the group consisting of alkyl (meth)acrylates having 1–18 carbon atoms in the alkyl groups, styrene or any mixtures of the above and the acrylic polymer having a weight average molecular weight of about 2,000–20,000 determined by gel permeation chromatography, (B) an acrylic polymeric additive consisting essentially of about 10–45% by weight, based on the weight of the additive, of polymerized hydroxyl containing monomers consisting of hydroxy alkyl (meth)acrylates having 1–4 carbon atoms in the alkyl groups, 5–80% by weight, based on the weight of the additive, of polymerized monomers selected from the group consisting of alkyl (meth)acrylates having 1–18 carbon atoms in the alkyl groups, styrene or any mixtures of the above and 10–50% by weight, based on the weight of the additive, of polymerized fluoro alkyl containing monomer represented by the formula

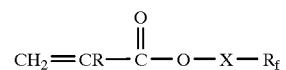

where R is selected from the group consisting of hydrogen or an alkyl group having 1–2 carbon atoms, X is a divalent radical and $R_f$ is a fluoro alkyl containing group having 4–20 carbon atoms and the additive having a weight average molecular weight of about 1,000–15,000 determined by gel permeation chromatography, and (C) an organic crosslinking agent; and where a cured layer of the coating of the composition has a combination of advancing water contact angle of at least 100° and a hexadecane advancing contact angle of at least 40°.

2. The coating composition of claim 1 in which the fluoro alkyl containing monomer is represented by the formula

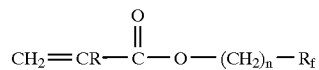

where R is as defined in claim 1, n is an integer of 1–11 and $R_f$ is a straight chain or branched chain fluoro alkyl group having 4–20 carbon atoms.

3. The coating composition of claim 2 in which the acrylic polymeric additive consists essentially of polymerized monomers of an alkyl methacrylate having 2–6 carbon atoms in the alkyl group, an alkyl acrylate having 2–8 carbon atoms in the alkyl group, a hydroxy alkyl acrylate having 2–4 carbon atoms in the alkyl group, styrene and a fluoro alkyl containing monomer wherein R is $CH_3$, n is 2 and $R_f$ is a fluoro alkyl group having 4–20 carbon atoms and the crosslinking agent is an organic polyisocyanate crosslinking agent and the cured layer of the composition has an advancing water contact angle of 100–120° and a hexadecane advancing contact angle of 45–85° C.

4. The coating composition of claim 3 in which the acrylic polymeric additive consists essentially of butyl methacrylate, butyl acrylate, styrene, hydroxy propyl acrylate and the fluoro alkyl containing monomer.

5. The coating composition of claim 1 in which the fluoro alkyl containing monomer is represented by the formula

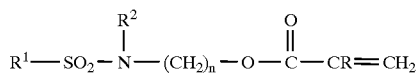

where
R is as defined in claim 1,
$R^1$ is a fluoro alkyl group having 4–12 carbon atoms,
$R^2$ is an alkyl group having 1–4 carbon atoms and
n is an integer of 1–4.

6. The coating composition of claim 1 in which the crosslinking agent is an organic polyisocyanate selected from the group of aromatic diisocyanate, aliphatic diisocyanate, cycloaliphatic diisocyanate, aromatic triisocyanate, aliphatic triisocyanate or an oligomer of a diisocyanate.

7. The coating composition of claim 1 in which crosslinking agent is a fluorinated organic polyisocyanate of an adduct of a fluorinated monofunctional alcohol and an organic polyisocyanate where the fluorinated monofunctional alcohol is represented by the formula

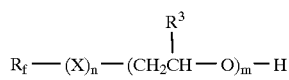

where $R_f$ is a fluoroalkyl containing group having at least 4 carbon atoms, X is a divalent radical, $R^3$ is H or an alkyl group having 1–4 carbon atoms, n is 0–1 and m is 1–30, provided that when n is 0, then m must be equal to or greater than 1, and where about 0.1–33 mole percent of active isocyanate groups are reacted with the fluorinated monofunctional alcohol.

8. The coating composition of claim 1 in which the crosslinking agent is an alkylated melamine formaldehyde crosslinking agent.

9. The coating composition of claim 1 containing pigment in a pigment to binder weight ratio of about 0.1/100–100/100.

10. The coating composition of claim 1 containing about 45–80% by weight of a binder and 20–55% by weight of an organic carrier liquid; wherein the binder comprises (A) about 30–89% by weight, based on the weight of the binder, of an acrylic polymer consisting essentially of about 20–50% by weight, based on the weight of the acrylic polymer, of polymerized hydroxyl containing monomers consisting of hydroxy alkyl (meth)acrylates having 1–4 carbon atoms in the alkyl groups, and 50–80% by weight, based on the weight of the acrylic polymer, of polymerized monomers selected from the group consisting of alkyl (meth)acrylates having 1–18 carbon atoms in the alkyl groups, styrene or any mixtures of the above and the acrylic polymer having a weight average molecular weight of about 2,000–20,000 determined by gel permeation chromatography, (B) about 1–20% by weight, based on the weight of the binder, of an acrylic polymeric additive consisting essentially of about 10–45% by weight, based on the weight of the additive, of polymerized hydroxyl containing monomers consisting of hydroxy alkyl (meth)acrylates 1–4 carbon atoms in the alkyl groups, 5–80% by weight, based on the weight of the acrylic polymer, of polymerized monomers selected from the group consisting of alkyl (meth)acrylates having 1–18 carbon atoms in the alkyl groups, styrene or any mixtures of the above and 10–50% by weight, based on the weight of the additive, of polymerized fluoro alkyl containing monomer represented by the formula:

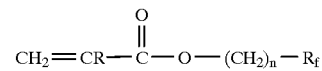

where R is selected from the group consisting of hydrogen or an alkyl group having 1–2 carbon atoms, n is an integer of 1–11 and $R_f$ consists of a straight chain or branched chain fluoro alkyl containing group having 4–20 carbon atoms and the acrylic polymer having a weight average molecular weight of about 1,000–10,000 determined by gel permeation chromatography, and (C) about 10–50% by weight, based on the weight of the binder, of an organic polyisocyanate crosslinking agent selected from the group consisting of aromatic diisocyanate, aliphatic diisocyanate, cycloaliphatic diisocyanate, aromatic triisocyanate, aliphatic triisocyanate or an oligomer of a diisocyanate; and where a cured layer of the coating of the composition has a combination of advancing water contact angle of 100–120° and a hexadecane advancing contact angle of 40–85°.

11. The coating composition of claim 1 containing about 0.1–10% by weight, based on the weight of the binder, of ultraviolet light stabilizer or an antioxidant or mixtures thereof.

12. A substrate coated with a dried and cured layer of the composition of claim 1.

13. A substrate coated with a pigmented base coat which is coated with a clear layer of the dried and cured composition of claim 1.

* * * * *